United States Patent [19]
Zijp

[11] Patent Number: 6,108,292
[45] Date of Patent: Aug. 22, 2000

[54] OPTICAL SCANNING UNIT COMPRISING A FIRST AND A SECOND LENS UNIT

[75] Inventor: Ferry Zijp, Eindhoven, Netherlands

[73] Assignee: U.S. Philips Corporation, New York, N.Y.

[21] Appl. No.: 09/275,364

[22] Filed: Mar. 24, 1999

[30] Foreign Application Priority Data

Mar. 26, 1998 [EP] European Pat. Off. .............. 98200961

[51] Int. Cl.$^7$ ....................................................... G11B 7/00
[52] U.S. Cl. ...................... 369/112; 369/44.22; 360/103; 359/819
[58] Field of Search ................................. 369/44.22, 112, 369/13, 270, 44.14, 44.23, 258, 266; 384/129, 907.1, 112, 123; 360/102, 103; 356/345, 360; 359/824, 654, 819, 794

[56] References Cited

U.S. PATENT DOCUMENTS

| | | | |
|---|---|---|---|
| 3,591,243 | 7/1971 | Knippenberg et al. | 384/129 |
| 3,855,624 | 12/1974 | Reinhoudt | 360/103 |
| 4,021,101 | 5/1977 | Camerik | 369/112 |
| 4,210,371 | 7/1980 | Gerkema et al. | 378/133 |
| 5,125,750 | 6/1992 | Corle et al. | 359/819 |
| 5,193,084 | 3/1993 | Christiaens | 369/258 |
| 5,673,245 | 9/1997 | Yanagawa et al. | 369/112 |
| 5,729,393 | 3/1998 | Lee et al. | 359/819 |
| 5,774,281 | 6/1998 | Maeda et al. | 359/822 |
| 5,828,453 | 10/1998 | Yamamoto et al. | 356/345 |
| 5,883,872 | 3/1999 | Kino | 369/112 |

FOREIGN PATENT DOCUMENTS

| | | |
|---|---|---|
| 0727777A1 | 8/1996 | European Pat. Off. . |
| 63-173012 | 7/1988 | Japan . |
| 18505A | 1/1989 | Japan . |
| 08212579A | 8/1996 | Japan . |
| 8-212579 | 8/1996 | Japan . |
| 10069648 | 10/1998 | Japan ............................ G11B 7/08 |

OTHER PUBLICATIONS a. 0/8 Numerical Aperture Two Element Objective Lens for the Optical Disc, by Kenji Yamamoto et al, International Symposium, Jul. 8–12 1996, OFA 2–1/345—OFA 2–3/347.

*Primary Examiner*—John W. Cabeca
*Assistant Examiner*—Kim-Kwok Chu
*Attorney, Agent, or Firm*—Leroy Eason

[57] ABSTRACT

Apparatus for optically scanning an information plane of a disc-shaped optical record carrier having an underlying surface extending parallel to the information plane. A radiation source supplies a scanning beam, and an optical scanning unit has a lens system which focuses the scanning beam to a scanning spot on the information plane. The lens system has an optical axis, a first lens unit with a first lens having an entrance side (11) and an exit side (13), and a second lens unit with a second lens situated opposite the exit side of the first lens. The scanning unit also includes a drive motor for displacing the first lens along the optical axis and a rotation element for adjusting the position of the second lens with respect to the underlying surface of the record carrier. To inhibit spherical and/or comatic and astigmatism aberrations during scanning, the rotation element is rotatably driven and forms part of the second lens unit. It is journaled in a stationary element (17), and has a disc-shaped surface provided with a pattern of grooves therein. This results in increased air pressure in the gap between the underlying surface of the record carrier and the rotation element during scanning, thereby maintaining a correct gap spacing.

10 Claims, 4 Drawing Sheets

OPTICAL SCANNING UNIT COMPRISING A FIRST AND A SECOND LENS UNIT

BACKGROUND OF THE INVENTION

1. Field of the Invention

The invention relates to an optical scanning device for scanning an information plane of a disc-shaped optical recording medium having an underlying surface extending parallel to the information plane. Such scanning device comprises a radiation source for supplying a scanning beam, and an optical scanning unit having a lens system for focusing the scanning beam to a scanning spot on the information plane. The lens system has an optical axis and comprises a first lens unit with a first lens having an entrance side for the scanning beam and an exit side situated opposite thereto, and a second lens unit with a second lens situated opposite the exit side of the first lens. The scanning unit also comprises drive means for displacing the first lens along the optical axis, and adjusting means for adjusting the positioning of the second lens with respect to the underlying surface of the recording medium.

2. Description of Related Art

A scanning device of this type is known from International Symposium on optical memory and optical data storage, conference edition Jul. 8–12, 1996 (ISOM 96); OFA 2-1/345—OFA 2-3/347; A. 0.8 Numerical Aperture Two Element Objective Lens for the Optical Disc; Kenji Yamamoto et al. The known device is intended for scanning a magneto-optical disc and is provided with a first holder having an objective lens and a transparent plate, and a second holder having a solid immersion lens (SIL). The magneto-optical disc has an information layer and a transparent layer, which information layer is read via the transparent layer. For focusing and tracking, a focusing actuator and a tracking actuator are provided for driving the first holder. A SIL actuator is present for displacing the second holder with the solid immersion lens in the focal direction in dependence upon a change of capacitance of a capacitor formed between the two holders. This has for its object to inhibit spherical aberration due to thickness deviations of the transparent layer. In this connection, reference is also made to JP-A 08212579, published Aug. 20, 1996. In addition to thickness variations, an optical disc located on a rotating table may be curved, for example bent through due to the fact that the disc is only supported in its center during scanning. Consequently, the optical disc has a certain tilt with respect to the scanning beam, which results in coma and astigmatism during scanning. Such optical aberrations are not prevented by the known measures.

SUMMARY OF THE INVENTION

It is an object of the invention to provide a scanning device of the type described in the opening paragraph, with which the occurrence of spherical and/or comatic and/or astigmatic aberration can be inhibited during scanning.

To this end, the scanning device according to the invention is characterized in that the adjusting means comprises a rotatably driven rotation element which forms part of the second lens unit and is journaled in a stationary element, said rotation element having a disc-shaped surface provided with a pattern of grooves for co-operation with the underlying surface of the recording medium. During scanning, the groove pattern, generally consisting of spiral grooves, ensures that a pressure is generated in the air present between the rotation element and the recording medium when the rotation element is rotating.

The adjusting means used in the scanning device according to the invention is actually a self-adjusting lens device which ensures that during scanning the second lens, which is a solid immersion lens (SIL), is instantaneously maintained at a correct position and in a correct parallel orientation with respect to the recording medium. The second lens is preferably a known partly spherical or aspherical lens with a plane lens surface remote from the first lens and hence facing the recording medium. The distance between the second lens and the recording medium is determined by, or is a function of, the thickness of the air gap between the underlying surface of the record carrier facing the lens system and the parallel extending disc-shaped surface of the rotating rotation element. The dimension, notably the height, of the air gap is, inter alia, dependent on the implementation of the groove pattern and the number of revolutions of the rotation element. In addition to the above-mentioned advantage, the adjusting means as used in the scanning device according to the invention has the advantage that the lens system can be brought and/or maintained in a focal position also in the presence of a stationary, i.e. non-rotating recording medium. The pattern of grooves or spiral grooves may be a known pattern, for example of the type used in axial dynamic spiral groove bearings, the grooves ensuring a pressure build-up between the grooved surface and, extending opposite this surface, the underlying surface of the recording medium.

When using the scanning device according to the described invention, the measures render it possible to accurately follow, during scanning, the recording medium's underlying surface facing the lens system, so that aberrations due to tilt of the medium can be limited to a minimum. This is particularly important when using radiation having a relatively short wavelength and/or when using a lens system having a relatively large numerical aperture. For obtaining larger information densities, the trend is to make use of radiation having an increasingly smaller wavelength and/or an increasingly larger numerical aperture.

It is to be noted that EP-A 0 727 777 discloses a scanning device which uses a pick-up unit with an objective lens and a semi-spherical lens secured in a sliding body which is supported by a leaf spring. When an optical disc is being scanned, the sliding body is in sliding contact with the optical disc surface facing the objective lens. A drawback of this known scanning device is that the sliding action of the sliding body can be easily disturbed by dirt or dust particles on the surface facing the objective lens. A further drawback is that positioning and orientation of the objective lens can only take place when the optical disc rotates.

In an embodiment of the optical scanning device according to the invention a bearing is used which requires little space and can be easily integrated in the assembly constituted by the stationary element and the rotation element. The bearing may comprise both a radial spiral groove bearing section and an axial spiral groove bearing section, so that the rotation element is journaled by means of bearing grooves both in the radial and the axial direction. During rotation of the rotation element, an axial bearing gap having a certain rigidity, dependent on the rotational speed of the rotation element, is formed between the stationary element and the rotation element in the absence of the recording medium. In the presence of the recording medium, also an air gap is formed between the rotation element and the recording medium, as described hereinbefore. In this way, a perfect balance can be realized between the rotation element and the recording medium, on the one hand, and the rotation element and the stationary element, on the other hand, within which balance the outer surface of the medium can be accurately followed by the second lens.

A practical embodiment of the optical scanning device according to the invention uses an electric rotation motor which is preferably a drive unit integrated in the combination constituted by the stationary element and the rotation element.

In a further embodiment of the optical scanning device according to the invention it is achieved that the position and orientation of the second lens is directly coupled to the position and orientation of the rotation element, so that an accurate tracking of the outer surface of the recording medium is easily ensured during use.

In another embodiment of the optical scanning device according to the invention the second lens is adjusted through adjustment of the stationary element. Such a construction may be notably preferred if very strict requirements are imposed on the central arrangement of one lens with respect to the other.

Another embodiment of the optical scanning device according to the invention has the advantage that the second lens unit is movable along with the first lens unit. Consequently, the second lens, viewed in the focusing direction, actually has a two-step adjusting facility, in which the drive means ensures a coarse adjustment and the adjusting means ensures a fine adjustment.

In another embodiment of the optical scanning device according to the invention a bearing particularly a spiral groove bearing, is present between the rotation element and the stationary element, which bearing allows tilts of the rotation element with respect to the stationary element about axes which are transverse to the optical axis.

In another embodiment of the optical scanning device according to the invention tilts which are required for tracking the recording medium are made possible by the elastic means which is present and which comprises, for example, one or more resilient elements.

A further embodiment of the optical scanning device according to the invention may be favorable if no larger movements of the second lens unit in the focal direction are required. The mass of the movable part of the drive means may be smaller in this embodiment than in other embodiments.

The invention also relates to an optical scanning unit suitable for use in the optical scanning device according to the invention. The scanning unit known from said ISOM 96 publication comprises a lens system for focusing the scanning beam to a scanning spot on an information plane, which lens system has an optical axis, a first lens unit with a first lens having an entrance side for the scanning beam and a facing exit side, and a second lens unit with a second lens located opposite the exit side of the first lens, which scanning unit also comprises a drive means for displacing the first lens along the optical axis, and an adjusting means for adjusting the second lens with respect to the recording medium.

The invention improves the known scanning unit in such a way that it can be used for inhibiting spherical aberration and/or coma and/or astigmatism when it is used in a scanning device.

To this end, the scanning unit according to the invention is characterized in that the adjusting means comprises a rotatably driven rotation element which forms part of the second lens unit and is journaled in a stationary element, which rotation element has a disc-shaped surface provided with a pattern of spiral grooves for co-operation with an outer surface of a recording medium during operation.

The invention also relates to an optical player having a displacement device which may comprise a known slide or swivel arm.

These and other aspects of the invention are apparent from and will be elucidated with reference to the embodiments described hereinafter.

DESCRIPTION OF THE PREFERRED EMBODIMENTS

Figure 1:
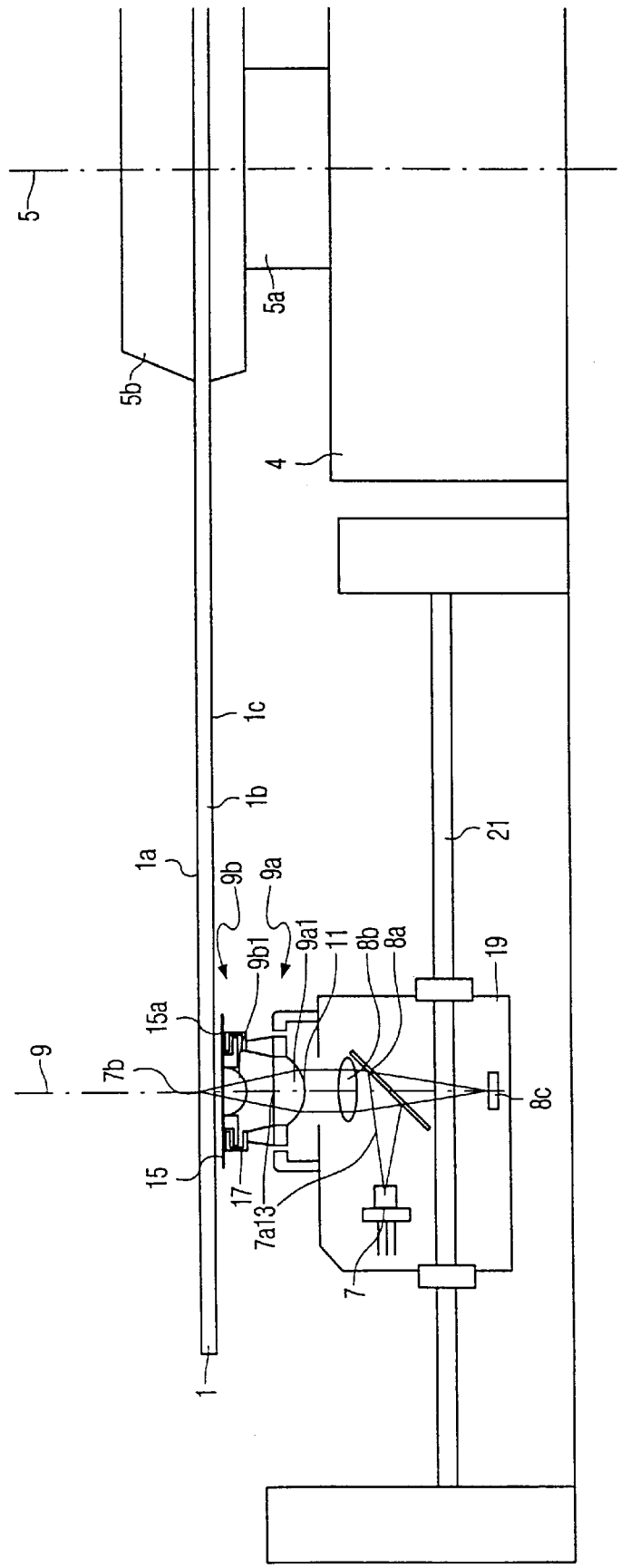
FIG. 1 shows diagrammatically an optical player with an embodiment of the optical scanning device according to the invention.

The scanning device shown in FIG. 1 is intended for writing and/or reading a disc-shaped information or recording medium 1, particularly an optical disc, in which information can be stored or has been stored in an information plane 1a. Information may be stored in the form of a large number of optically, magneto-optically or magnetically readable small areas (not shown) which are arranged in concentric or quasi-concentric tracks jointly constituting a spiral track. The information plane 1a has a protective coating (not shown) on one side, the upper side in the situation shown, and is supported on the other side by a transparent substrate or transparent layer 1b having an underlying surface 1c extending parallel to the information plane.

The scanning device comprises an electric drive unit 4, particularly an electric motor, for rotatably driving the recording medium 1 about a rotation axis 5. For fixing the recording medium 1, the drive unit 4 may be provided with a rotary table or a drive spindle 5a with a clamping member 5b. The scanning device further comprises a scanning unit and a radiation source 7, particularly a laser source, for generating a scanning beam 7a.

The scanning unit comprises a lens system for focusing the radiation beam 7a to a scanning spot 7b on the information plane 1a of the recording medium during scanning of this recording medium. The lens system has an optical axis 9 and comprises a first lens unit 9a, with a first lens 9a1, and a second lens unit 9b with a second lens 9b1. The first lens 9a1, also referred to as objective lens, has an entrance side 11 for the scanning beam and a facing exit side 13 opposite which the second lens 9b1, also referred to as SIL, is situated. The scanning unit also comprises a drive means, particularly an electromagnetic actuator, for displacing the first lens 9a1 along the optical axis 9, and an adjusting means for adjusting the second lens 9b1 with respect to the recording medium 1. The adjusting means comprises a rotatably driven rotation element 15 which forms part of the second lens unit 9b, is journaled in a stationary element 17 and has a disc-shaped surface 15a with a pattern of grooves, the surface 15a co-operating, during scanning and with a rotating rotation element 15, with the outer surface 1c of the rotating or non-rotating recording medium 1, generating a pressure in the air present between the two surfaces 15a and 1c.

Figure 8:
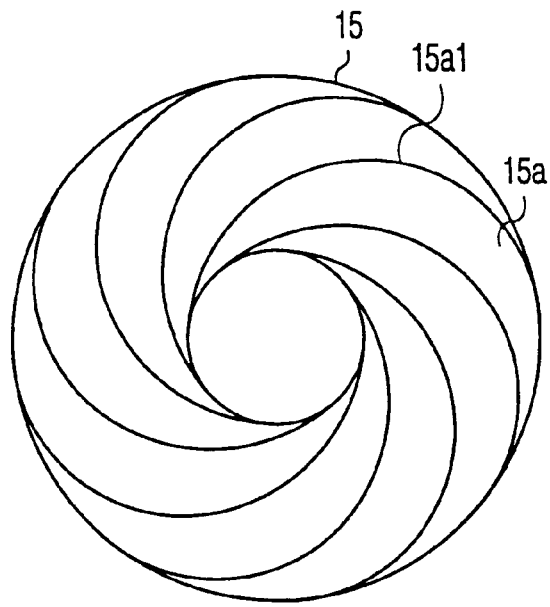
FIG. 8 is a plan view of an embodiment, shown diagrammatically, of an element of the scanning unit according to the invention.

FIG. 8 shows an embodiment of the element 15 in a plan view. A rotationally symmetrical part of the surface 15a has regularly distributed shallow grooves 15a1 which extend spirally in such a way that, upon rotation of the rotation element 15 with respect to a recording medium 1 which is present, the air between the rotation element 15 and the recording medium 1 is compressed.

Figure 9:
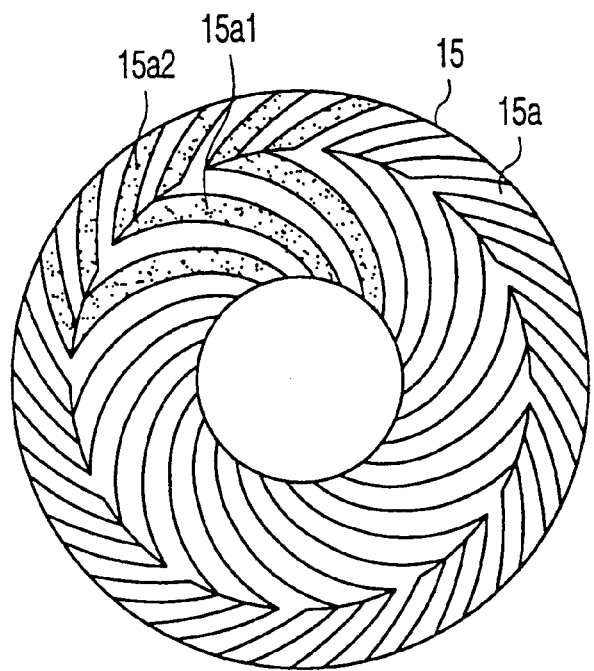
FIG. 9 is a plan view of a variant of the element shown in FIG. 8.

FIG. 9 shows an implementation of the surface 15a in which two patterns with grooves 15a1 and 15a2 instead of one groove pattern are present. In the presence of a recording medium, air is compressed in the grooves in this implementation, which results in an air gap between the rotation element and the recording medium.

The scanning device shown in FIG. 1 forms part of an optical player which is also provided with a displacement device, in this example a slide 19 for radially or approximately radially displacing the scanning unit fixed thereon with respect to the rotation axis 5, the slide 19 being movable along a straight guidance member 21. In this example, the scanning beam 7a emitted by the radiation source 7 during scanning is collimated by a collimator lens 8b after reflection by a reflective surface of a transparent plane-parallel plate 8a and subsequently focused to the scanning spot 7b by said lens system. The information layer 1a reflects the radiation beam to form a reflected radiation beam which is converged by the lenses which are present and reaches a detection system 8c via the plate 8a. The detection system 8c supplies a detection signal during readout, which detection signal corresponds to the information stored in the information layer 1a. A servosystem is provided for accurately positioning the lens 9a1 with respect to the recording medium 1.

Figure 2:
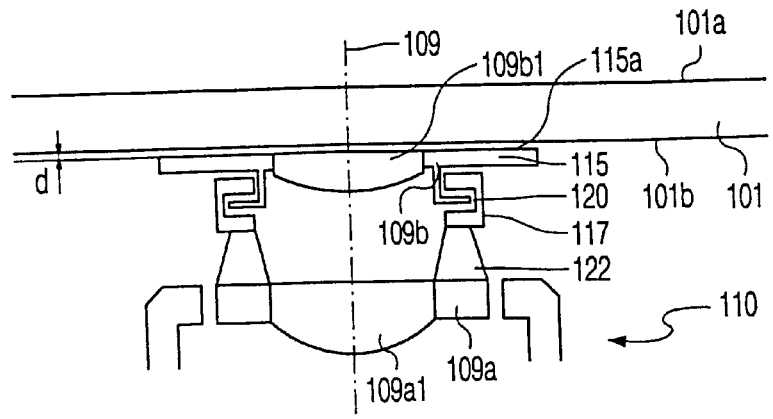
FIG. 2 shows diagrammatically a part of a first embodiment of the scanning unit according to the invention, used in the optical scanning device.
Figure 3:
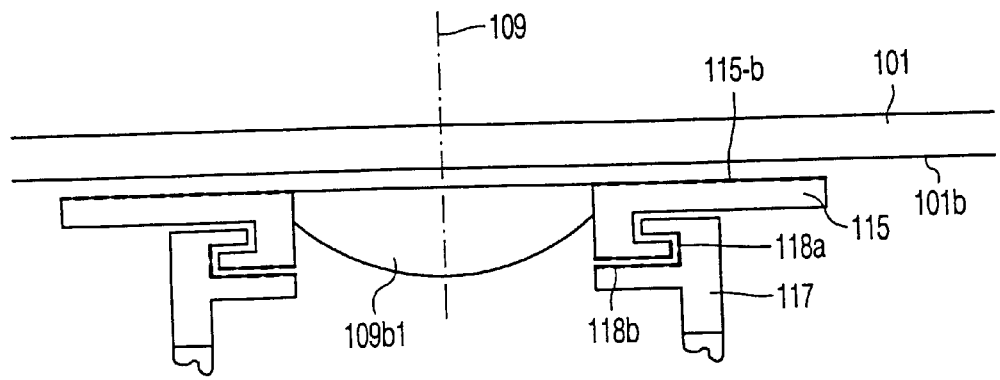
FIG. 3 shows diagrammatically a larger part of the first embodiment.

The scanning unit partly shown in FIGS. 2 and 3 has a lens system for focusing a scanning beam to a scanning spot on an information plane 101a of a medium 101, particularly an information or recording medium. The lens system has an optical axis 109 and is provided with a first lens unit 109a, with a first lens 109a1, and a second lens unit 109b with a second lens 109b1. The scanning unit further comprises a known electromagnetic actuator 110 for displacing the first lens along the optical axis 109, and an adjusting means for adjusting the second lens 109b1 with respect to the recording medium 101. The adjusting means forms part of the second lens unit 109b and comprises a rotation element 115 having a disc-shaped surface 115a provided with a pattern of grooves 115b and facing the medium 101. The rotation element 115 is rotatably journaled with respect to a cylindrical stationary element 117 for which a radial and axial spiral groove bearing 118a, 118b is used in this example. Such a bearing is known per se and used, for example, as a bearing for a head drum in a video recorder as shown in JP-A 1-8505.

To drive the rotation element 115, an electric rotation motor is provided which has a stator section comprising the stationary element 117 and a rotor section comprising the rotation element 115. The rotor section comprises, for example a permanent disc-shaped or cylindrical magnet, and the stator section comprises a set of drive coils in order that both sections of the rotation motor can magnetically co-operate over an air gap 120. During rotation of the rotation element 115, hence when the rotation motor is energized, the spiral groove bearing which is present ensures that pressure is built up in the medium, for example in the form of air, between the stationary and rotary bearing sections, which not only results in a perfect bearing but also in a force on the second lens unit 109b, which force is directed towards the recording medium. Simultaneously, pressure is built up in the air between the surface 115 provided with grooves 115b and the outer surface 101b of the recording medium 101, which exerts a force on the second lens unit 109b, which force is directed away from the recording medium 101. When the scanning unit is suitably dimensioned, both oppositely directed forces ensure a stable position of the second lens 109b1 at a defined distance d from the recording medium 101, so that an accurate tracking of the outer surface 101b is ensured during scanning. In order that the required movements of the lens unit 109b during tracking of the outer surface 101b are made possible, the bearing in this example is dimensioned in such a way that the rotation element 115 can perform tilted movements with respect to the stationary element 117 secured to the first lens unit 109a through a rigid connection 122.

Figure 4:
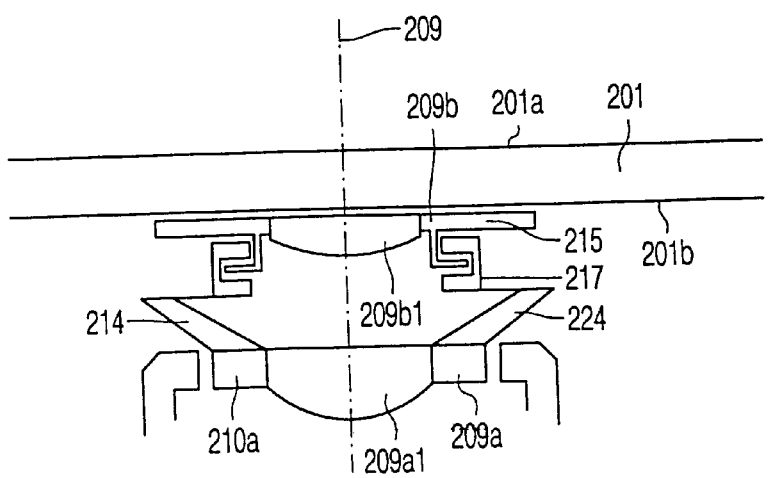
FIG. 4 shows diagrammatically a part of a second embodiment of the scanning unit according to the invention.

The scanning device according to the invention, partly shown in FIG. 4, is intended for scanning a disc-shaped optical recording medium 201 having an information plane 201a and an outer surface 201b extending parallel thereto. The scanning device comprises a lens system with an optical axis 209, provided with a first lens unit 209a, with a first lens 209a1, and a second lens unit 209b with a second lens 209b1. The scanning unit also comprises an electromagnetic drive means 210 for displacing the first lens unit 209a with the first lens 209a1 along the optical axis. Moreover, the scanning unit comprises an adjusting means for adjusting the second lens unit 209b with the second lens 209b1 with respect to the recording medium 201. The adjusting means comprises a rotatably driven rotation element 215 which is axially and radially journaled in a stationary element 217. The rotation element 215 forms part of the second lens unit 209b, supports the second lens 209b1 and has a disc-shaped surface 215a with a pattern of spiral grooves for co-operation with the outer surface 201b of the medium 201. The stationary element 217 is secured to a movable part 210a of the drive means 210 by way of an elastic means, in this example three leaf springs 224. This renders the combination constituted by the rotation element 215 and the stationary element 217 tiltable about axes directed transversely to the optical axis 209 during tracking of the recording medium 201.

Figure 5:
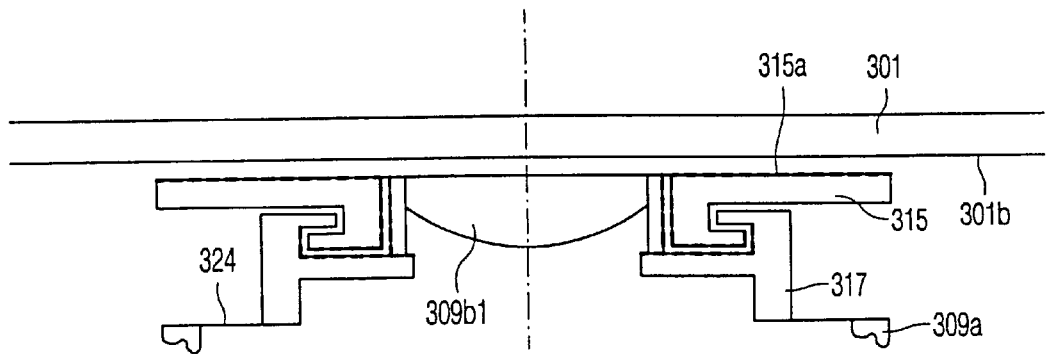
FIG. 5 shows diagrammatically a part of a third embodiment.
Figure 6:
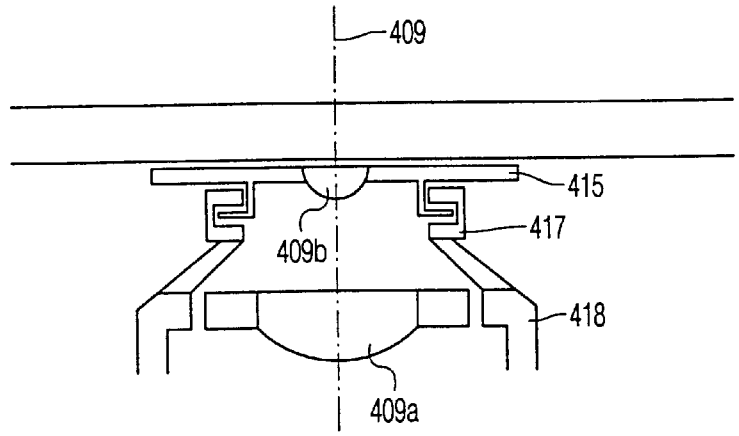
FIG. 6 shows diagrammatically a part of a fourth embodiment of the scanning unit according to the invention.
Figure 7:
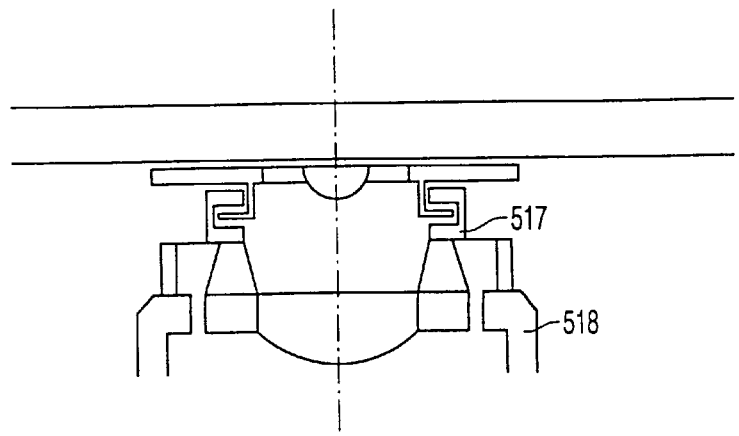
FIG. 7 shows diagrammatically a part of a fifth embodiment of the scanning unit according to the invention.

The embodiments shown in FIGS. 5, 6 and 7 largely resemble the embodiments already described. The description of the embodiments shown in FIGS. 5, 6 and 7 is therefore mainly limited to details deviating from the scanning units shown in FIGS. 1, 2 and 3.

The scanning unit shown in FIG. 5 has a first lens unit 309a and a second lens unit 309b with a second lens 309b1. The second lens unit 309b comprises a stationary element 317 which is secured in a displaceable and tiltable manner to the second lens unit 309a via an elastic means such as a leaf spring construction 324. The second lens 309b1 is secured to the stationary element 317. The scanning unit also comprises an adjusting means in the form of a rotatably driven rotation element 315 which is journaled in the stationary element 317, and which has a disc-shaped surface 315a with a spiral groove pattern for co-operation with an outer surface 301b of a recording medium 301. The journaling of the rotation element 315 with respect to the stationary element is effected in this example by means of an aerodynamic spiral groove bearing which comprises both axial bearing sections and radial bearing sections. The movements made by the second lens 309b1 during adjustment are directly derived from the movements of the stationary element 317 in the construction shown. This has the advantage that the position of the second lens 309b1 is less sensitive to fluctuations of the rotating rotation element 315 due to small radial deviations of the mass center from the geometrical axis. The second lens 309b1 does not make a rotation.

FIG. 6 shows an embodiment of a scanning device with a stationary element 417 which is rigidly secured to a stationary frame 418, for example, constituted by a stationary part of a drive means for displacing a first lens 409a along an optical axis 409. A rotation element 415, which is aerodynamically journaled in the stationary element 417, supports a second lens 409b.

It is to be noted that the invention is not limited to the embodiments shown. Direct variations of the implementation of the adjusting means are possible within the scope of the invention. However, an essential point is that the adjusting means comprises a rotatably driven rotation element which is journaled in a stationary element and has a surface with a pattern of grooves for co-operation with an outer surface of a recording medium for building up pressure in air which is present between the two surfaces.

FIG. 7 shows an embodiment of a scanning device with a stationary element 517 which is resiliently secured to a stationary frame 518.

It is to be noted that the invention is not limited to the embodiments shown, For example, the pattern of grooves may be implemented in a different way than is shown. As regards the claims, it is to be noted that various characteristic features as defined in the dependent claims may occur in combination.

What is claimed is:

1. An optical scanning apparatus for scanning an information plane of a disc-shaped optical record carrier having an underlying surface extending parallel to the information plane, said scanning apparatus including a radiation source for supplying a scanning beam and an optical scanning unit which includes a lens system for focusing the scanning beam to a scanning spot on the information plane, said lens system having an optical axis and comprising:

(i) a first lens unit with a first lens having an entrance side for the scanning beam and an exit side opposite thereto, and (ii) a second lens unit with a second lens situated opposite the exit side of the first lens;

said scanning unit further comprising first drive means for rotating the record carrier, second drive means for displacing the first lens along the optical axis, and adjusting means for adjusting the position of the second lens with respect to the underlying surface of the record carrier;

said scanning apparatus being characterized in that the adjusting means comprises a rotatably driven rotation element which is journaled in a stationary element, said rotation element having a disc-shaped surface provided with a pattern of grooves which cause an increase in air pressure on said surface during rotation of said rotation element, to thereby maintain a constant distance between that surface and the underlying surface of the record carrier.

2. An optical scanning apparatus as claimed in claim 1, further comprising a spiral groove bearing for journaling the rotation element in the stationary element.

3. An optical scanning apparatus as claimed in claim 1, further comprising an electric motor having a stator section constituted by said stationary element and a rotor section constituted by said rotation element, the rotor section being magnetically coupled to the stator section over an air gap there-between.

4. An optical scanning apparatus as claimed in claim 1, wherein the second lens forms part of said rotation element.

5. An optical scanning apparatus as claimed in claim 1, wherein the second lens forms part of said stationary element.

6. An optical scanning apparatus as claimed in claim 1, wherein the stationary element is supported by a movable part of the second drive means.

7. An optical scanning apparatus as claimed in 6, wherein the stationary element is rigidly secured to the movable part, the rotation element being tiltably journaled in the stationary element.

8. An optical scanning apparatus as claimed in claim 6, wherein the stationary part is connected to the movable part by elastic connecting means.

9. An optical scanning apparatus as claimed in claim 1, wherein the stationary element is secured to a stationary frame of the scanning unit.

10. An optical scanning unit for use in an optical scanning apparatus as claimed in claim 1.

* * * * *